(12) United States Patent
Taylor et al.

(10) Patent No.: US 7,635,813 B2
(45) Date of Patent: Dec. 22, 2009

(54) ARTICLE AND METHOD FOR SEALING FLUID-CONTAINING CABLES

(75) Inventors: William L. Taylor, Round Rock, TX (US); Christopher J. Evoniuk, Austin, TX (US); Pradip K. Brandyopadhyay, Austin, TX (US); Rafael Garcia-Ramirez, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 172 days.

(21) Appl. No.: 11/852,500

(22) Filed: Sep. 10, 2007

(65) Prior Publication Data

US 2009/0065236 A1    Mar. 12, 2009

(51) Int. Cl.
*H02G 15/02* (2006.01)
(52) U.S. Cl. .................................... 174/74 R; 174/93
(58) Field of Classification Search ............ 174/74 R, 174/93, DIG. 8
See application file for complete search history.

(56) References Cited

U.S. PATENT DOCUMENTS

| | | | |
|---|---|---|---|
| 3,515,798 A | 6/1970 | Sievert | |
| 3,886,669 A | 6/1975 | Pelsue | |
| 4,110,550 A | 8/1978 | Di Pietro | |
| 4,188,352 A | 2/1980 | Suzuki et al. | |
| 4,645,801 A | 2/1987 | Barnhouse | |
| 4,942,906 A | 7/1990 | Igarashi et al. | |
| 5,374,784 A | 12/1994 | Wentzel | |
| 5,408,047 A | 4/1995 | Wentzel | |
| 5,714,715 A | 2/1998 | Sundhararajan et al. | |
| 5,804,630 A | 9/1998 | Heyer et al. | |
| 6,015,629 A * | 1/2000 | Heyer et al. ................ | 428/625 |
| 6,111,200 A | 8/2000 | De Schrijver | |
| 6,114,452 A | 9/2000 | Schmiegel | |
| 6,838,512 B2 | 1/2005 | Eggers et al. | |
| 7,396,499 B2 | 7/2008 | Frankel et al. | |
| 7,511,222 B2 | 3/2009 | Taylor et al. | |
| 2001/0011599 A1 | 8/2001 | De Buyst | |
| 2003/0080457 A1 | 5/2003 | Corveleyn | |
| 2004/0249054 A1 | 12/2004 | Eggers et al. | |
| 2005/0215661 A1 | 9/2005 | Vora | |
| 2005/0277731 A1 | 12/2005 | Fukuda et al. | |

(Continued)

FOREIGN PATENT DOCUMENTS

EP          1251000          10/2002

(Continued)

OTHER PUBLICATIONS

Albin, L. D.; Kosmala, J. L.; Stoskopf, A. H. "Fluoroelastomer—SR Blends Offer Compounders New Choices." *Rubber and Plastics News* 11(8) (Nov. 9, 1981): 28-30.

(Continued)

*Primary Examiner*—Chau N Nguyen
(74) *Attorney, Agent, or Firm*—Melanie Gover

(57) ABSTRACT

A cable has a conductor extending therefrom and a partially exposed fluid-containing layer surrounding the conductor. A connector is joined to an end of the conductor, and an electrically insulative, elastomeric tube is covers all of the exposed fluid-containing layer and a portion of the connector. The elastomeric tube is substantially impermeable to the fluid in the cable. For cables having more than one conductor, an additional elastomeric boot is installed over the cable.

19 Claims, 3 Drawing Sheets

U.S. PATENT DOCUMENTS

| | | |
|---|---|---|
| 2007/0027236 A1 | 2/2007 | Bandyopadhyay et al. |
| 2009/0065237 A1* | 3/2009 | Evoniuk et al. ............ 174/22 R |

FOREIGN PATENT DOCUMENTS

| | | |
|---|---|---|
| JP | 57126663 | 8/1982 |
| JP | 62084153 | 4/1987 |
| JP | 63081144 | 4/1988 |
| JP | 2028239 | 1/1990 |
| KR | 20-0121579 | 4/1998 |
| KR | 10-1998-0042906 | 8/1998 |
| KR | 10-0777062 | 11/2007 |
| SU | 01024480 | 6/1983 |
| WO | WO 99/62156 | 12/1999 |

OTHER PUBLICATIONS

Nakamura, Y.; Mori, K.; Wada, K. "Adhesion of Fluoroelastomer to Nitrile or Epichlorohydrin Rubber During Cure." *International Polymer Science and Technology* 12(2) (1985): T49-55.

Nersasian, A. "Compatability of Fuel-Handling Rubbers with Gasoline/Alcohol Blends." *Elastomerics* 112(10) (1980): 26-30.

Standard: "Standard Test Methods for Vulcanized Rubber and Thermoplastic Elastomers—Tension1," ASTM, Designation: D 412-98a (Reapproved 2002) Jan. 1, 2003, pp. 44-57.

Material Specification: SC-X15112B, General Dynamics Land System Division, "M1 Tank Program Material Specification for Insulation Sleeving, Boots and Transitions, Electrical, Heat Shrinkable," Feb. 19, 1991, 11 pages.

* cited by examiner

ARTICLE AND METHOD FOR SEALING FLUID-CONTAINING CABLES

FIELD

The present invention relates generally to cold-shrink articles for use in splice connections in electrical cables, and more particularly to a transition joint or seal for use when splicing or terminating a cable having an oil-impregnated layer.

BACKGROUND

Cold-shrink articles are used in a variety of applications including, for example, splicing together lengths of cable and protecting, sealing, and/or insulating spliced portions of the cable from adverse environmental conditions. A cold-shrink article generally refers to a member that is capable of being expanded and mounted in an expanded state on a removable support core. The support core is typically hollow to allow the support core and mounted cold-shrink article to be fed over a substrate. The support core is typically designed to collapse or otherwise be removed on demand and thereby allow the cold-shrink article to shrink from its expanded state into contact with a substrate positioned inside the support core. For a given application, a cold-shrink article is typically selected that, when released from the core in the absence of a substrate, will shrink from the expanded state on the core to a relaxed state having an inner diameter smaller than the outer diameter of the intended substrate. When deployed on the substrate, such sizing prevents the cold-shrink article from fully relaxing from the expanded state, which ensures a snug and resilient engagement between the cold-shrink article and the substrate. Once the cold-shrink article is conveyed onto the substrate, the cold-shrink article remains in a partially expanded state over the life of its engagement with the substrate.

Some constructions of electrical cables, particularly early constructions of cables intended for underground use, consist of a lead jacket surrounding one or more electrical conductors, with a layer of insulative, oil-impregnated paper placed between the lead jacket and the electrical conductors. Cables of this construction are commonly referred to as paper-insulated lead-covered cables ("PILC cables"). Although modern cables now have extruded dielectric (plastic) jackets with no fluid inside, there are still substantial amounts of PILC cables in use. When a PILC cable needs to be repaired, terminated, or spliced, a seal (often referred to as an "oil-stop") must be provided to contain fluid in the cable system, due to the deleterious effects caused by the egress of the oil or other dielectric fluid used. Fluid in the cable system is often under pressure due to thermal expansion of the fluid from energy dissipated by the energized cable, and the pressure often fluctuates as the internal temperature of the cable changes due to, for example, changing energy loads.

There are several different types of systems for providing an oil-stop in PILC cables. Some sealing systems install combinations of mastic or resin and tape or heat-shrink tubes over the cable. A problem with these solutions is that the seal does not expand and contract sufficiently with the thermal expansion and contraction of the cable (and the associated changes in oil pressure) and therefore tends to leak oil after some years in service. Other solutions use an elastomeric material (such as a rubber tube or rubber tape) covered with a restricting tape or compound that doesn't stretch. The restrictive cover prevents swelling of the elastomer as oil diffuses into the material, and thereby limits the amount of oil that can diffuse into the elastomer. The available systems for providing an oil-stop are also disadvantageous in that their installation is very labor intensive, the quality of the seal is sensitive to the skill of the installer, and the installation sometimes requires the handling of chemicals and/or heat sources in the field.

SUMMARY

Embodiments according the invention include, for example, a cold-shrink seal for a cable having a conductor surrounded by a fluid-containing layer. In one embodiment, the cable has an oil-containing layer surrounding the conductor. The cold-shrink seal comprises an electrically insulative, substantially oil-impermeable, elastomeric tube overlying the oil-containing layer, and an electrically insulative elastomeric boot overlying the elastomeric tube.

In another embodiment, a cable has a partially exposed central conductor, a partially exposed, oil-impregnated, electrically insulative paper layer surrounding the conductor, a partially exposed semiconducting layer surrounding the paper layer, and a lead jacket surrounding the semiconducting layer. The cold-shrink seal comprises an electrically insulative elastomeric tube contacting and surrounding the exposed portions of the semiconducting and paper layers. An electrically insulative elastomeric boot contacts and surrounds the elastomeric tube. In one implementation, the elastomeric tube comprises a composition of a fluoroelastomer or a blend of a fluoroelastomer and an epichlorohydrin.

In another embodiment, a cable has a partially exposed oil-containing layer surrounding the conductor. A connector is joined to a terminal end of the conductor. An electrically insulative, substantially oil-impermeable, elastomeric tube overlays all of the exposed oil-containing layer and at least a portion of the connector.

In another embodiment, an oil-stop is provided at an end of an electrical cable having a central conductor, an oil-containing layer surrounding the conductor, and a jacket surrounding the oil-containing layer. The oil-stop is formed by removing a portion of the jacket to expose a portion of the oil-containing layer, and then removing a portion of the oil-containing layer to expose a portion of the central conductor. A cold-shrink, electrically insulative, substantially oil-impermeable, elastomeric tube is placed in resilient conformity around the entire exposed portion of the oil-containing layer. The elastomeric tube imparts resilient pressure to the oil-containing layer.

DETAILED DESCRIPTION

Figure 1:
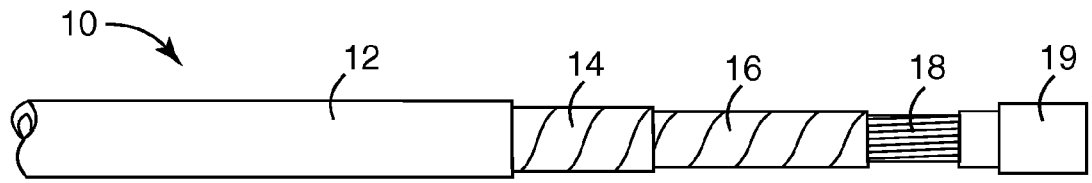
FIG. 1 is a side elevational view of the terminal end of a single conductor paper-insulated, lead-covered (PILC) electrical cable with portions of the various layers removed to expose the central conductor.

With reference now to the figures, and in particular with reference to FIG. 1, there is depicted an exemplary electrical cable 10 which contains a dielectric fluid therein. Cable 10 is representative of a paper-insulated lead-covered ("PILC") single conductor cable, and is constructed of an outer lead jacket 12, an intermediate semiconducting layer 14 formed of carbon-loaded paper or metalized paper, an oil-containing insulative layer 16 (formed of oil-impregnated paper in exemplary cable 10), and a central conductor or group of conductors 18. A semiconductive layer is present under insulative layer 16. Some cables 10 also have an outer plastic sheath surrounding and protecting the lead jacket 12.

For purposes of description, the present disclosure specifically describes the formation of a seal or oil-stop at an end of an oil-impregnated draining PILC cable to prevent leaking of fluid therefrom, thereby allowing a wide variety of accessories to be attached to the cable. It should be understood, however, that the teachings of this disclosure are equally applicable to cables having different constructions than the specific PILC cable construction described herein. For example, the teachings herein are applicable to mass-impregnated non-draining (MIND) cables that are impregnated with grease Similarly, the teachings of this disclosure are equally applicable to fluids other than oil, including high viscosity materials such as grease. Thus, as used herein, the term "PILC cable" is understood to encompass all types of cables having a fluid or viscous material therein, and the terms "oil" and "oil-stop" are understood to encompass all types of fluids or viscous materials used in cable constructions.

As shown in FIG. 1, cable 10 is prepared for installation of an oil-stop by first cutting off a section (e.g., 28 cm) of lead jacket 12, thereby exposing semiconducting layer 14. A slightly smaller section (e.g., 22 cm) of semiconducting layer 14 is similarly removed, exposing oil-containing insulative layer 16. Finally, an even smaller section (e.g., 11 cm) of oil-containing insulative layer 16 is removed, exposing central conductor 18. The semiconducting layer under insulative layer 16 is removed to substantially the same length as insulative layer 16. A cable transition connector 19 is installed on central conductor 18. Connector 19 may be any type of connector, including but not limited to connectors used for splicing or terminating cable 10.

Figure 2:
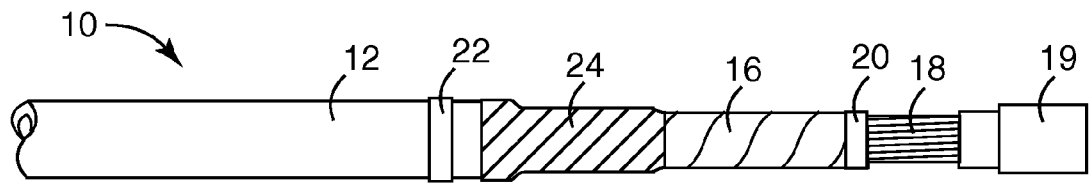
FIG. 2 is an elevational view similar to FIG. 1, wherein electrical stress-relief material has been applied to the end of the lead jacket and the intermediate semiconducting layer, and the paper insulation has been taped to prevent unraveling.

As shown in FIG. 2, in one implementation oil-containing insulative layer 16 is held in place by a strip of insulative adhesive tape 20, which keeps oil-containing insulative layer 16 from unraveling. A suitable tape for this purpose is sold by 3M Company, assignee of the present application, under the trade designation "33+ vinyl electrical tape." A second strip of tape 22 may be placed on lead jacket 12 near its cut edge (e.g., within 1-2 cm) to mark the location of the cut edge of lead jacket 12 as explained below. The same type of tape may be used for tape 22 as was used for tape 20.

As further preparation for the formation of an oil-stop according to one embodiment, cable 10 is provided with some form of dielectric stress relief. In one embodiment, this is accomplished by winding a high-dielectric constant tape 24 around the terminal portion of lead jacket 12 and semiconducting layer 14. Stress control tape 24 completely covers semiconducting layer 14 and slightly overlaps (e.g., 1 cm) oil-containing insulative layer 16. A suitable tape for this purpose is available from 3M Company under the trade designation "2220 stress control tape."

Figure 3:
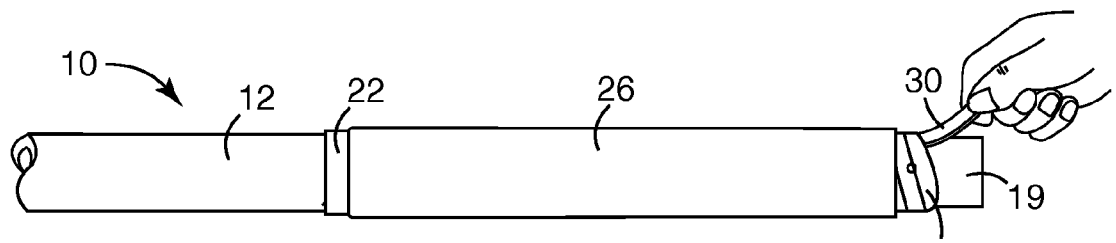
FIG. 3 is an elevational view similar to FIGS. 1 and 2, further illustrating application of the elastomeric cold-shrink tube which forms an oil-stop.

With reference now to FIG. 3, the first element of the oil-stop is an elastomeric tube 26. Elastomeric tube 26 is electrically insulative and substantially oil-impermeable, and as described in greater detail below, is formed of a composition comprising a fluoroelastomer or a blend of a fluoroelastomer and an epichlorohydrin. As used herein, the term "substantially oil-impermeable" encompasses both limited and absolutely impermeability to the particular fluid contained in the cable. Limited impermeability is defined by the maximum allowed percent weight increase as set forth in Military Spec, SC-X15111B (Sep. 27, 1984). Elastomeric tube 26 is typically fabricated by extrusion or molding and, in its relaxed state, is generally cylindrical. As used herein, the terms "tube," "tubular," "cylinder," "cylindrical," etc., are not limited to objects having a circular cross-section, but rather denote a hollow, elongated member of any cross-section. Elastomeric tube 26 can be either a single-layer element, or may be formed as a multiple-layered element with other elastomers to provide for combined mechanical support, or to make the system more economically attractive.

The size of elastomeric tube 26 may vary considerably, depending upon the size of cable 10. In one embodiment, the length of elastomeric tube 26 is equal to or greater than the length from lead jacket 12 to connector 19. The diameter of elastomeric tube 26 (in its relaxed state) is smaller than the diameter of insulative layer 16, typically one millimeter or larger. Due to the elastic properties of elastomeric tube 26, a single diameter tube may conveniently be used on cables 10 having a range of diameters. Of course, in the expanded state shown in FIG. 3, the diameter of elastomeric tube 26 is greater than the diameter of cable 10. The thickness of elastomeric tube 26 (in its relaxed state) may vary depending upon the intended application.

Prior to installation onto cable 10, elastomeric tube 26 is supported on a removable core 28 as is conventionally known, for example as described in U.S. Pat. No. 3,515,798 to Sievert. Removable core 28 maintains elastomeric tube 26 in a radially expanded state, and is also generally cylindrical and slightly longer than elastomeric tube 26. The diameter of removable core 28 may vary widely, the only practical requirement being that it is larger than the outer diameter of cable 10, and provides sufficient clearance for the core 28 to be removed. The wall of core 28 typically has a thickness in the range of one millimeter to five millimeters. Removable core 28 is constructed of any durable, flexible material, such as cellulose acetate butyrate, polypropylene, polyethylene or polyvinyl chloride. In one embodiment, removable core 28 is a helically coiled strip having adjacent coils joined in a separable manner, thereby allowing core 28 to be collapsed and removed from within tube 26 by firmly pulling and unwinding the end 30 of the strip.

Figure 4:
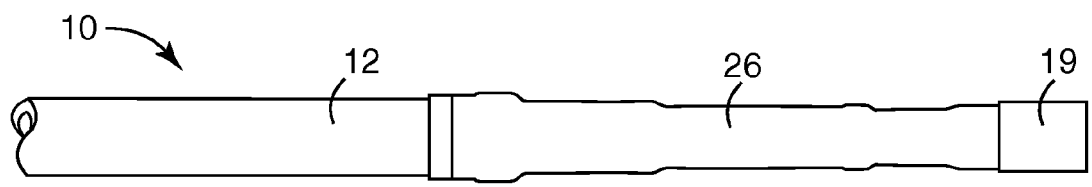
FIG. 4 is an elevational view further depicting the elastomeric tube of FIG. 3 in resilient conformity with the PILC cable.

As shown in FIG. 3, one end of elastomeric tube 26 is held adjacent marking tape 22. As end 30 of removable core 28 is pulled, elastomeric tube 26 slowly shrinks in place around cable 10, until it is in tight and resilient conformity with cable 10 as shown in FIG. 4. In the embodiment illustrated in FIG. 4, elastomeric tube 26 overlaps lead jacket 12 by about two centimeters (2 cm) and overlaps connector 19 by a similar distance. Elastomeric tube 26 thus provides an oil-stop that prevents the leaking of fluid from within cable 10 and also preventing the ingress of water into cable 10.

It should be noted that elastomeric tube 26 is in direct contact with oil-containing insulative layer 16, and is applying resilient pressure to oil-containing layer 16. As used herein, "resilient pressure" refers to the ability of the installed elastomeric member to expand and contract with changes in size of the underlying substrate and changes in pressure of the cable fluid due to, for example, thermal expansion and contraction. Beneficially, therefore, as elastomeric tube 26 cyclically and elastically expands and contracts, the deformation of elastomeric tube 26 provides pressure relief to the fluid in cable 10, and limits the pressure in cable 10.

Figure 5:
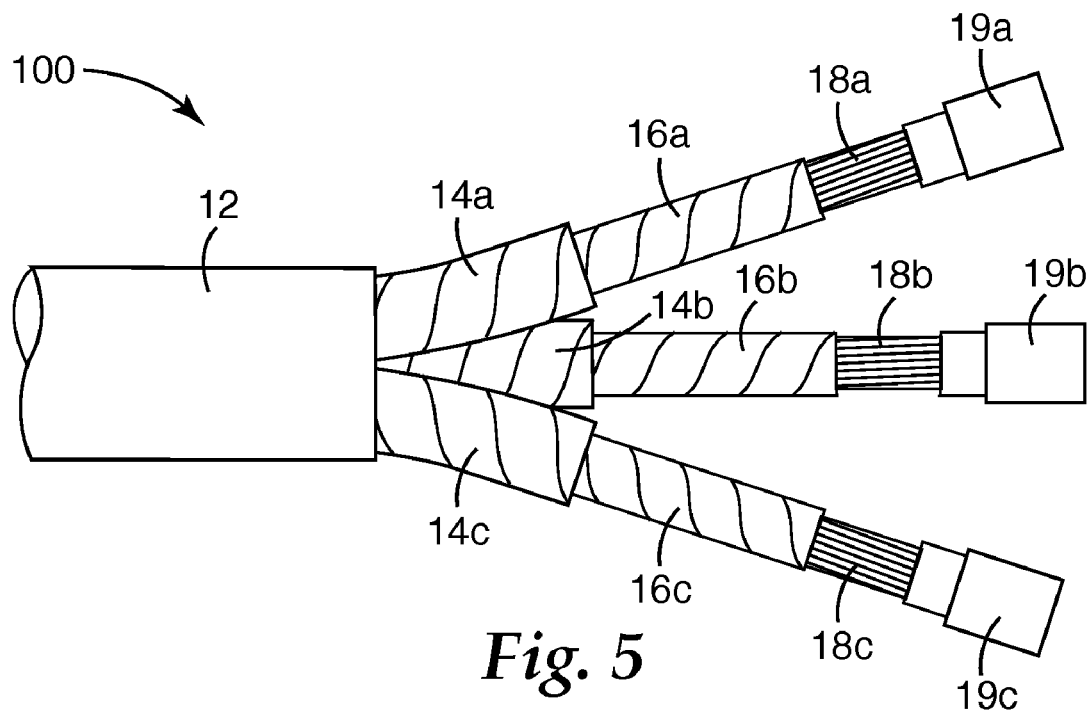
FIG. 5 is a side elevational view of the terminal end of a three-conductor PILC cable, with portions of the various layers removed to expose the three conductors.

As noted above, PILC cables may include more than one central conductor 18. With reference to FIG. 5, a cable 100 is representative of a PILC cable having a plurality of conductors 18. Cable 100 is illustrated as having three conductors 18a, 18b, 18c (collectively conductors 18), although other numbers of conductors are possible. Similar to cable 10 described above with reference to FIGS. 1-4, each conductor 18a, 18b, 18c of cable 100 is surrounded by a corresponding oil-containing insulative layer 16a, 16b, 16c, respectively, (collectively oil-containing insulative layers 16) formed of oil-impregnated paper in exemplary cable 100, which is in turn surrounded by a corresponding intermediate semiconducting layer 14a, 14b, 14c, respectively, (collectively semiconducting layers 14) formed of carbon-loaded paper or metalized paper. The group of conductors 18 (i.e., each conductor 18 with its corresponding insulative layer 16 and semiconducting layer 14) is surrounded by a single outer lead jacket 12 to form cable 100. Some cables 100 also have an outer plastic sheath surrounding and protecting the lead jacket 12.

As shown in FIG. 5, cable 100 is prepared for installation of an oil-stop by first cutting off a section of lead jacket 12, thereby exposing and allowing separation of the plurality of conductors 18 and associated semiconducting layers 14 and oil-containing layers 16. Each of the plurality of conductors 18 in cable 100 is prepared in a manner similar to that described above with respect to conductor 18 of cable 10 (FIG. 1). That is, a section of semiconducting layer 14 is removed to expose the underlying oil-containing insulative layer 16, and then a smaller section of oil-containing insulative layer 16 is removed to expose the underlying central conductor 18. Cable transition connectors 19a, 19b, 19c (collectively connectors 19) are then installed on central conductors 18. As noted above, connector 19 may be any type of connector, including but not limited to connectors used for splicing or terminating cable 10.

Figure 6:
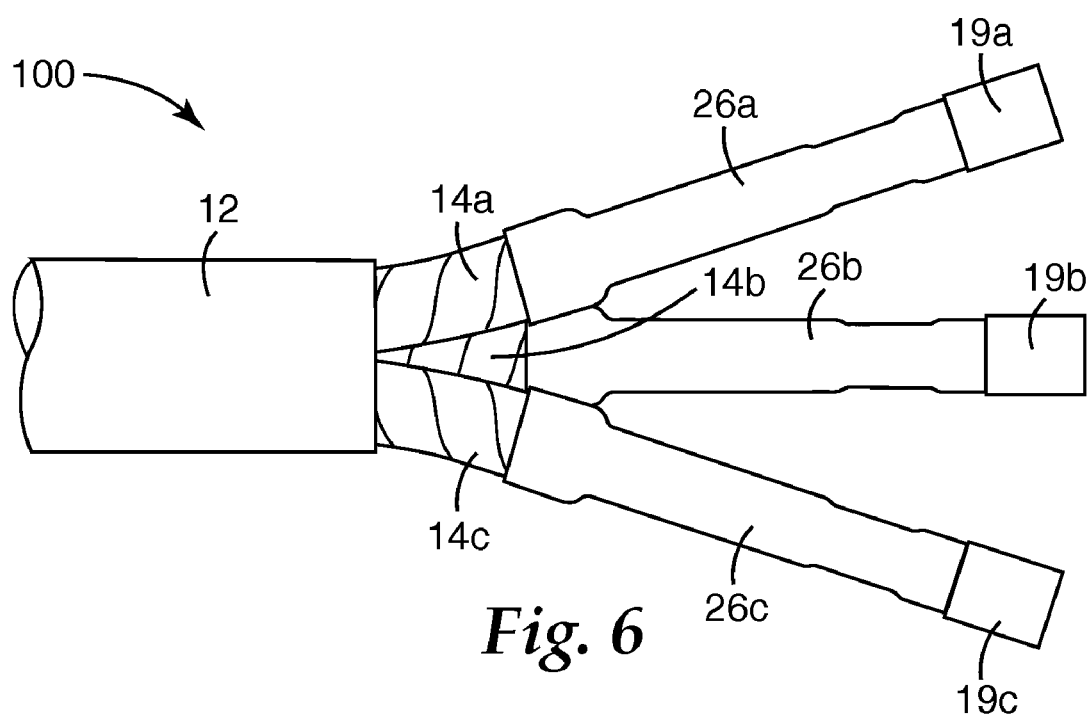
FIG. 6 is an elevational view similar to FIG. 5, further depicting elastomeric tubes in resilient conformity with each the conductors of the PILC cable.

As shown in FIG. 6, for each prepared conductor 18a, 18b, 18c, an elastomeric tube 26a, 26b, 26c, respectively, is installed in a manner similar to that described with reference to FIGS. 1-4 above, although the provision of dielectric stress relief, such as by winding a high-dielectric constant tape around the terminal portion of lead jacket 12 and semiconducting layer 14, may be omitted. As described above with respect to FIGS. 1-4, elastomeric tubes 26 are electrically insulative and substantially oil-impermeable, and as described in greater detail below, are formed of a composition comprising a fluoroelastomer or a blend of a fluoroelastomer and an epichlorohydrin. In one embodiment, the length of each elastomeric tube 26 is equal to or greater than the length from lead jacket 12 to connector 19. In the embodiment illustrated in FIG. 6, each elastomeric tube 26 overlaps connector 19 by about two centimeters (2 cm), but does not extend fully to lead jacket 12 due to the converging nature of conductors 18. In one embodiment, elastomeric tubes 26 are positioned as close to lead jacket 12 as is possible.

As shown in FIG. 6, after installation, each of elastomeric tubes 26 is in tight and resilient conformity with its corresponding conductor 18, oil-containing insulative layer 16, and semiconducting layer 14. Each elastomeric tube 26 is in direct contact with the underlying oil-containing insulative layer 16, and is applying resilient pressure to oil-containing layer 16.

Figure 7:
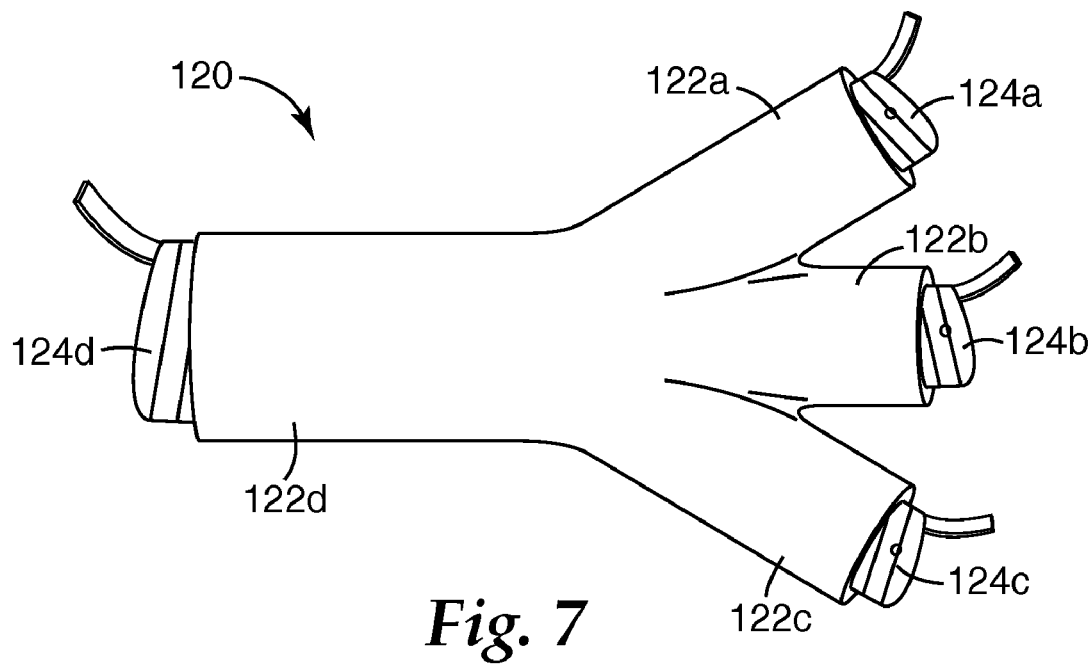
FIG. 7 is a perspective view of a branched cold-shrink article in an expanded state on a plurality of cores.
Figure 8:
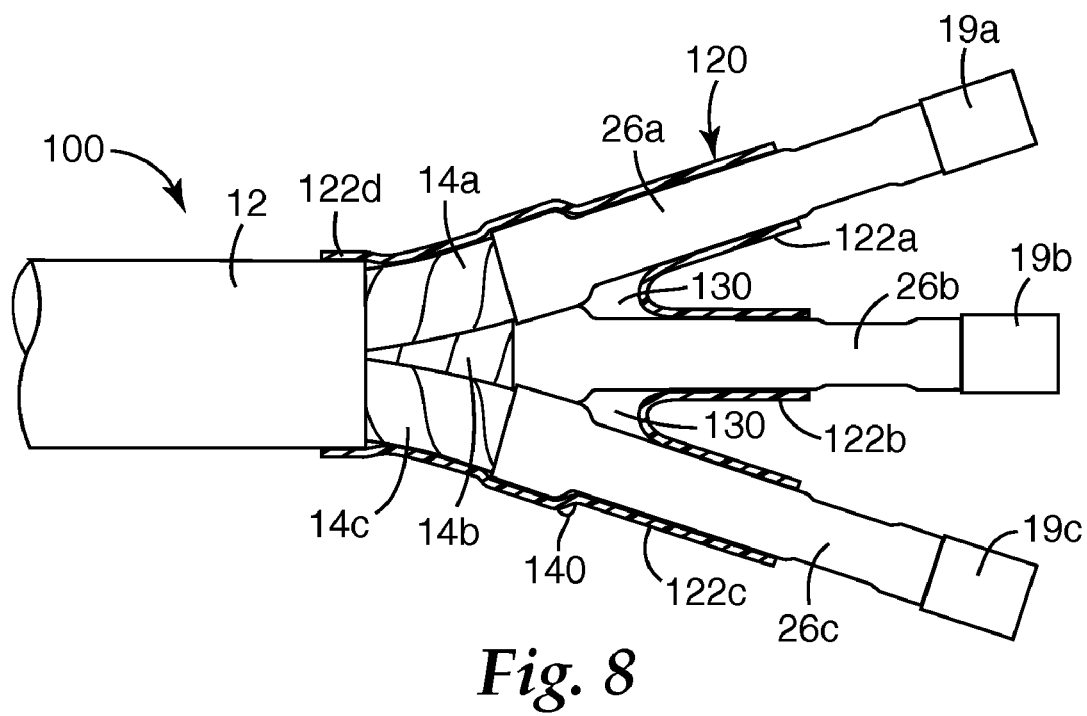
FIG. 8 is a partial sectional view showing the branched cold-shrink article of FIG. 7 installed on the PILC cable of FIG. 6.

With reference to FIGS. 7 and 8, a second element of the oil-stop for cable 100 is illustrated. In particular, an exemplary elastomeric boot 120 is illustrated. Elastomeric boot 120 is a branched cold-shrink article having a plurality of hollow elastomeric portions (or members) 122a, 122b, 122C, and 122d that are in communication with each other. FIG. 7 shows hollow elastomeric portions 122a, 122b, 122c, and 122d in an expanded state on corresponding removable cores 124a, 124b, 124c, and 124d. In one embodiment, elastomeric boot 120 is electrically insulative. In one embodiment, elastomeric boot 120 is substantially oil-impermeable. In one embodiment, elastomeric boot 12 is formed of a composition comprising a fluoroelastomer or a blend of a fluoroelastomer and an epichlorohydrin. In one embodiment, elastomeric boot 120 and elastomeric tubes 26 are formed of substantially the same composition. In one embodiment, elastomeric boot 120 is semiconductive to aid in providing dielectric stress relief. Elastomeric boot 120 is typically fabricated by molding. As with elastomeric tube 26, elastomeric boot 120 can be either a single-layer element, or may be formed as a multiple-layered element with other elastomers to provide for combined mechanical support, or to make the system more economically attractive.

As seen in FIG. 7, elastomeric boot 120 is formed in the shape of a glove with a large opening (portion 122d) sized to receive the intact cable 100 and a number of smaller openings (portions 122a, 122b, and 122c) at the other end allowing the separated individual conductors 18 to exit elastomeric boot 120. The number of smaller openings corresponds to the number of conductors 18 in cable 100.

The elastomeric boot 120 (more particularly portions 122a, 122b, 122c, and 122d thereof) may be deployed onto cable 100 and the prepared conductors 18 pursuant to the methods described above in relation to deployment of elastomeric tubes 26. In particular, as removable cores 124a, 124b, 124c, and 124d are removed, the respective portions 122a, 122b, 122c, and 122d of elastomeric boot 120 shrink into place, until they are in tight and resilient conformity with cable 100 as shown in FIG. 8. As with elastomeric tube 26, the size of elastomeric boot 120 may vary considerably depending upon the size of the cable 100 and conductors 18 therein. Portions 122a, 122b, 122c, and 122d are sized in diameter to effectively seal against the corresponding outer surfaces of cable 100 and elastomeric tubes 26a, 26b, 26c when in their contracted state. In one embodiment, as illustrated in FIG. 8, the lengths of portions 122a, 122b, 122c, and 122d in their contracted state are sufficient to allow portion 122d to overlap lead jacket 12 of cable 100 by about two centimeters (2 cm), and the lengths of portions 122a, 122b, and 122c are sufficient to overlap the underlying elastomeric tube 26a, 26b, 26c by about 5 cm to 8 cm. Of course, other amounts of overlap by elastomeric boot 120 are possible and may be desired depending upon the intended application. Once elastomeric boot 120 is in place, the oil-stop is complete. This assembly creates a reliable seal and prevents the egress of any fluid from cable 100 while also preventing the ingress of water into cable 100.

In some applications, the presence of voids, or the possibility of voids, under elastomeric boot 120 (such as at the areas 130 between portions 122a, 122b, and 122c) may be avoided by providing elastomeric boot 120 with a nipple 140 (FIG. 8) for extracting air during or after installation of elastomeric boot 120.

It should be noted that elastomeric boot 120 is applying resilient pressure to the underlying elastomeric tubes 26, and also to the underlying oil-containing layers 16. That is, both elastomeric tubes 26 and elastomeric boot 120 expand and contract with changes in size of the underlying cable 100 and changes in pressure of the cable fluid due to, for example, thermal expansion and contraction. Beneficially, therefore, as elastomeric tubes 26 and elastomeric boot 120 cyclically and elastically expand and contract, pressure relief is provided to the fluid in cable 100, and the pressure of fluid in cable 100 is limited.

The oil-stops as described herein effectively convert the end of a PILC cable (either single core or multi-core) into a plastic cable. The PILC cable may then accommodate the use of various cable accessories which are normally limited to extruded dielectric cables. For example, a connector may be used to attach a termination lug to central conductor 18, or a separate splice assembly may be used to connect cable conductors 18 to other cable conductors (not shown). The other cable may be an extruded dielectric cable, or a PILC cable which also has an oil-stop according to the instant disclosure.

As referenced above, embodiments of the instant disclosure include cold-shrink articles formed from elastomeric compositions that incorporate at least a fluorelastomer and an epichlorohydrin. Examples of suitable elastomeric compositions that incorporate at least a fluorelastomer and an epichlorohydrin are described in detail in co-pending and commonly assigned United States patent application titled "Cold-Shrink Article and Method of Making Cold-Shrink Article," Ser. No. 11/191,838, filed Jul. 28, 2005, which is incorporated by reference herein in its entirety.

The term "epichlorohydrin", as used herein, refers to any substance containing epichlorohydrin, including any polymer containing epichlorohydrin monomers such as, for example, homopolymers, copolymer, terpolymers, and tetrapolymers that contain epichlorohydrin. The term "cold-shrink", as used herein, is defined as the capability of an article (or a portion of an article) to shrink from an expanded state toward a relaxed, or a partially expanded, state at room temperature conditions (e.g., about 20° C.-25° C.) and in the absence of heating.

Elastomers are included in the elastomeric compositions of cold-shrink articles to allow the cold-shrink articles to expand from a relaxed state to an expanded state, while also allowing the articles to cold-shrink back toward the relaxed state. A fluoroelastomer can be included in the elastomeric compositions of the present invention. The fluoroelastomer can be combined or used with various types of compositions or materials, for example, an epichlorohydrin, a EPDM layer, nitrile rubber, and various other compositions or materials. A mixture of fluoroelastomer and epichlorohydrin can be included in the elastomeric compositions of the present invention. Some embodiments of cold-shrink articles of the present invention may be exposed, in an expanded state, to temperatures of at least about 150° C. for an extended period of time without exhibiting, upon unaided visual inspection by a human eye, any splitting, tearing, or breakage.

Unless otherwise stated, all concentrations herein are expressed in parts by weight per hundred parts by weight rubber (phr), with the rubber defined to be the total weight of both fluoroelastomer and epichlorohydrin. Thus, as used herein, the phr of a particular component represents the parts by weight of the component relative to 100 total parts by weight of fluoroelastomer and epichlorohydrin.

A wide range of concentrations of epichlorohydrin and fluoroelastomer may be included in the elastomeric compositions of the present invention. For example, in some embodiments, the elastomeric composition of the tube and/or boot comprises in the range of about 10 parts to about 60 parts of fluoroelastomer per 100 total parts of fluoroelastomer and epichlorohydrin. In some embodiments, the elastomeric composition of the tube and/or boot comprises in the range of about 40 parts to about 90 parts epichlorohydrin per 100 total parts of fluoroelastomer and epichlorohydrin. As used herein, in the context of polymers containing epichlorohydrin (e.g., homopolymers, copolymers, terpolymers, and tetrapolymers that contain epichlorohydrin), parts by weight of epichlorohydrin refers to the total weight of the polymer containing the epichlorohydrin.

Reinforcing filler material may optionally be included in the elastomeric composition of the present invention to enhance the split and tear properties of cold-shrink articles (formed from the elastomeric composition) at elevated temperatures. Examples of suitable filler materials include silica-based reinforcement filler, reinforcement-grade carbon black, fluoroplastics, clays, and any combination of any of these in any proportions. Examples of suitable fillers are described in detail in the above-noted U.S. patent application Ser. No. 11/191,838. As used therein, the term "silica-based reinforcement filler" is defined to include all compounds of the formula $SiO_2$ (e.g., pure silica); all compositions that include at least about ten weight percent of $SiO_2$ and/or an $SiO_2$ derivative, based upon the total weight of the composition; all silicates; and any combination of any of these in any proportion. The phrase "reinforcement-grade carbon black", as used therein, includes any carbon black with an average particle size smaller than about 40 nm, which corresponds to an average surface area of about 65 $m^2/g$.

The elastomeric composition may then be formed into a cold-shrink article by any suitable process such as, for example, extrusion or molding. In some embodiments, the elastomeric composition of the cold-shrink article is cured, autoclaved, or irradiated, to affect physical properties of the elastomeric composition. Examples of suitable curing, autoclaving, and irradiating methods are described in detail in the above-noted U.S. patent application Ser. No. 11/191,838.

The elastomeric compositions of the present invention may be formed into cold-shrink articles of any shape or geometric configuration known in the art. Some non-exhaustive examples of cold-shrink articles include tubing, plaques, and multiple-branched structures (i.e., glove-like structures with multiple entrances and/or exits).

Cold-shrink articles of the present invention (formed from elastomeric compositions of the present invention) may exhibit various advantageous mechanical properties in various combinations under various environmental conditions (e.g., room temperature or 150° C.). In some embodiments, cold-shrink articles of the present invention such as tubing and plaques may exhibit an elongation at break of at least about 450% at room temperature and/or an elongation at break of at least about 250% at 150° C., when tested pursuant to the procedures of the Property Analysis and Characterization Procedure section of this document. Some embodiments of the cold-shrink articles of the present invention such as tubing and plaques may exhibit a percent permanent set of less than about 35% at 100° C., when tested pursuant to the procedures of the Property Analysis and Characterization Procedure section. Furthermore, some embodiments of tubing and plaques formed from compositions of the present invention may exhibit a percent permanent set of less than about 25% at 100° C. In some embodiments, plaques formed from compositions of the present invention may exhibit a percent permanent set of less than about 20% at 100° C.

Various embodiments of the cold-shrink articles of the present invention resist tearing or splitting at elevated temperatures. For example, some embodiments of the cold-shrink articles of the present invention resist tearing when maintained in an expanded state for an extended period of time (e.g, seven days in a 200% radially-expanded state) at an elevated temperature of about 150° C.

Various embodiments of the cold-shrink articles of the present invention exhibit chemical resistance to substances such as, for example, diesel fuel and hydraulic fluid. Some embodiments of the cold-shrink articles of the present invention exhibit a percent weight increase of less than about 25% when immersed in diesel fuel at about 49° C. for 24 hours and/or a percent weight increase of less than about 10% when immersed in hydraulic fluid at about 71° C. for 24 hours.

Although the present invention has been described with reference to preferred embodiments, workers skilled in the art will recognize that changes may be made in form and detail without departing from the spirit and scope of the invention.

The invention claimed is:

1. A cold-shrink seal for a cable having a plurality of conductors extending therefrom, and each of the plurality of conductors has a corresponding oil-containing layer surrounding the conductor, the cable end seal further comprising:
a plurality of cold shrink, electrically insulative, substantially oil-impermeable, elastomeric tubes, each elastomeric tube in tight conformity around an exposed portion of a corresponding one of the oil-containing layers, each elastomeric tube imparting resilient pressure to each oil-containing layer, wherein each elastomeric tube comprises a fluoroelastomer or a blend of fluoroelastomer and epichlorohydrin; and
a cold shrink, electrically insulative elastomeric boot around the plurality of conductors, the boot having a glove-like body including a single opening at a first end of the body and a plurality of openings at a second end of the body, the plurality of openings corresponding in number to the plurality of cable conductors, the boot applied to the cable such that each one of the cable conductors and its corresponding elastomeric tube exits the boot through a corresponding one of the multiple openings, the elastomeric boot imparting pressure to a portion of each one of the elastomeric tubes and oil-containing layer.

2. The cold-shrink seal of claim 1 wherein the elastomeric boot comprises a composition comprising a fluoroelastomer or a blend of a fluoroelastomer and an epichlorohydrin.

3. The cold-shrink seal of claim 2, wherein the elastomeric boot comprises in the range of about 10 parts to about 60 parts of fluoroelastomer per 100 total parts of fluoroelastomer and epichlorohydrin, and wherein the elastomeric boot comprises in the range of about 40 parts to about 90 parts epichlorohydrin per 100 total parts of fluoroelastomer and epichlorohydrin.

4. The cold-shrink seal of claim 1, wherein the elastomeric tube comprises in the range of about 10 parts to about 60 parts of fluoroelastomer per 100 total parts of fluoroelastomer and epichlorohydrin, and wherein the elastomeric tube comprises in the range of about 40 parts to about 90 parts epichlorohydrin per 100 total parts of fluoroelastomer and epichlorohydrin.

5. The cold-shrink seal of claim 1, wherein the elastomeric tube further comprises a filler material selected from the group consisting of reinforcement-grade carbon blacks, silica-based fillers, clays, fluoroplastics, metal oxides, and combinations thereof.

6. The cold-shrink seal of claim 1, wherein the cable comprises a PILC cable.

7. The cold-shrink seal of claim 1, wherein the elastomeric tube and boot are configured to elastically deform with expansion and contraction of oil in the oil-containing layer and provide relief of internal pressure in the cable.

8. A cold-shrink seal at a terminal end of a cable, the cable having a plurality of partially exposed central conductors, each conductor having a partially exposed, oil-impregnated, electrically insulative paper layer surrounding the conductor, a partially exposed semiconducting layer surrounding the paper layer, and a lead jacket surrounding the semiconducting layer, the cold-shrink seal comprising:
a cold-shrink, electrically insulative, substantially oil-impermeable elastomeric tube in tight conformity around the exposed portions of the semiconducting and paper layers of each conductor, the elastomeric tube comprising a composition of a fluoroelastomer or a blend of a fluoroelastomer and an epichlorohydrin; and
a cold-shrink electrically insulative elastomeric boot around a portion of each elastomeric tube, the boot having a glove-like body including a single opening at a first end of the body and a plurality of openings at a second end of the body, the plurality of openings corresponding in number to the plurality of conductors, the boot applied to the cable such each one of the conductors and its corresponding elastomeric tube exits the boot through a corresponding one of the multiple openings, the elastomeric boot imparting resilient pressure to a portion of each one of the elastomeric tubes and oil-containing layer therein.

9. The cold-shrink seal of claim 8, wherein the elastomeric boot comprises a composition of a fluoroelastomer or a blend of a fluoroelastomer and an epichlorohydrin.

10. The cold-shrink seal of claim 9, wherein the elastomeric tube and the elastomeric boot comprise in the range of about 10 parts to about 60 parts of fluoroelastomer per 100 total parts of fluoroelastomer and epichlorohydrin, and wherein the elastomeric tube and the elastomeric boot comprise in the range of about 40 parts to about 90 parts epichlorohydrin per 100 total parts of fluoroelastomer and epichlorohydrin.

11. The cold-shrink seal of claim 8, wherein the elastomeric tube has a length that is substantially equal to or greater than the combined lengths of the exposed portions of the semiconducting and paper layers.

12. The cold-shrink seal of claim 11, wherein the elastomeric boot has a length that is substantially equal to or greater than the length of the elastomeric tube.

13. The cold-shrink seal of claim 8 wherein the elastomeric boot further surrounds a portion of the lead jacket and a portion of the central conductor.

14. A method of providing an oil-stop at a terminal end of an electrical cable having a plurality of conductors extending therefrom, and each of the plurality of conductors has a corresponding oil-containing layer surrounding the conductor, the method further comprising:
for each one of the plurality of conductors and corresponding oil-containing layers,
removing a portion of the jacket, thereby exposing a portion of the oil-containing layer;
removing a portion of the oil-containing layer, thereby exposing a portion of the central conductor; and
placing a cold-shrink, electrically insulative, substantially oil-impermeable, elastomeric tube in tight conformity around a portion of the exposed portion of the oil-containing layer, the elastomeric tube imparting resilient pressure to the oil-containing layer, wherein the elastomeric tube comprises a composition comprising a fluoroelastomer and an epichlorohydrin; and installing a cold-shrink, electrically insulative, elastomeric boot around the plurality of conductors, the boot having a glove-like body including a single opening at a first end of the body and a plurality of openings at a second end of the body, the plurality of openings corresponding in number to the plurality of conductors, the boot applied to the cable such each one of the conductors and its corresponding elastomeric tube exits the boot through a corresponding one of the multiple openings, the elastomeric boot imparting resilient pressure to a portion of each one of the elastomeric tubes and oil-containing layer therein.

15. The method of claim 14, wherein imparting resilient pressure to the oil-containing layer provides relief of internal pressure in the cable.

16. The method of claim 14, wherein installing the boot comprises overlapping the jacket and the central conductor.

17. The method of claim 14, wherein imparting resilient pressure to the oil-containing layers provides relief of internal pressure in the cable.

18. A cable transition joint comprising:

a cable having a plurality of conductors extending therefrom and a partially exposed oil-containing layer surrounding each conductor;

a connector joined to a terminal end of each conductor; and for each of the plurality of conductors, a cold shrink, electrically insulative, substantially oil-impermeable, elastomeric tube in tight conformity around a portion of the exposed oil-containing layer and a portion of the connector, the elastomeric tube comprising a composition of a fluoroelastomer or a blend of a fluoroelastomer and an epichlorohydrin; and a cold-shrink electrically insulative elastomeric boot around a portion of each elastomeric tube, the boot having a glove-like body including a single opening at a first end of the body and a plurality of openings at a second end of the body, the plurality of openings corresponding in number to the plurality of conductors, the boot applied to the cable such each one of the conductors and its corresponding elastomeric tube exits the boot through a corresponding one of the multiple openings, the elastomeric boot imparting resilient pressure to a portion of each one of the elastomeric tubes and oil-containing layer therein.

19. The cable transition joint of claim 18, wherein the elastomeric tube comprises in the range of about 10 parts to about 60 parts of fluoroelastomer per 100 total parts of fluoroelastomer and epichlorohydrin, and wherein the elastomeric tube comprises in the range of about 40 parts to about 90 parts epichlorohydrin per 100 total parts of fluoroelastomer and epichlorohydrin.

* * * * *

UNITED STATES PATENT AND TRADEMARK OFFICE
CERTIFICATE OF CORRECTION

PATENT NO.         : 7,635,813 B2                                    Page 1 of 1
APPLICATION NO.    : 11/852500
DATED              : December 22, 2009
INVENTOR(S)        : William L. Taylor et al.

It is certified that error appears in the above-identified patent and that said Letters Patent is hereby corrected as shown below:

Title Page - Page 2
Item [56], References Cited, OTHER PUBLICATIONS, Line 4, delete
"Compatability" and insert -- Compatibility -- therefore.

Column 7
Line 24, delete "fluorelastomer" and insert -- fluoroelastomer -- therefore.
Line 26, delete "fluorelastomer" and insert -- fluoroelastomer -- therefore.

Column 10
Line 36, in Claim 10, delete "comprise" and insert -- comprises -- therefore.

Signed and Sealed this

Ninth Day of February, 2010

David J. Kappos
*Director of the United States Patent and Trademark Office*